United States Patent [19]
Allcock et al.

[11] Patent Number: 5,101,003
[45] Date of Patent: Mar. 31, 1992

[54] METHOD FOR FORMING POLYTHIOPHOSPHAZENE MACROMOLECULES

[75] Inventors: Harry R. Allcock; Jeffrey A. Dodge; Ian Manners; Gerhard Renner, all of State College, Pa.; Oskar Nuyken, Munich, Fed. Rep. of Germany

[73] Assignee: The Pennsylvania Research Corporation, University Park, Pa.

[21] Appl. No.: 474,411

[22] Filed: Feb. 2, 1990

[51] Int. Cl.$^5$ .................. C08G 79/02; C08G 73/00
[52] U.S. Cl. .................. 528/167; 528/422; 525/538; 525/535
[58] Field of Search .......... 528/167, 422; 525/538, 525/535

[56] References Cited

PUBLICATIONS

Zeldin, M. et al., "Inorganic and Organometallic Polymers", *ACS Symp. Ser,* 1988, 360, 250–282.
Wannagat, U. et al.; Angew Chem., 1962, 74, 117.
Becke-Goering, M., et al.; *Z. Anorg. Allg chem.,* 1963, 325, 287.
Allcock, H. R., Angew, Chem. Int. Ed. Engl. 16:147 (1977).
Allcock, H. R., Chemical & Engineering News 63:22 (Mar. 18, 1985).
Allcock, H. R., "Current Status of Polyphosphazene Chemistry" (Chapter 10 in "Inorganic and Organometallic Polymers", ACS Symp. Ser. 360 (1988).
Kanatzidis, M. G., et al., J. Am. Chem. Soc. 111:760 (1989).
Manners, I. et al., J. Am. Chem. Soc. 111:5478 (1989).
Seyferth, D. et al., Chemistry of Materials 1:45 (1989).

*Primary Examiner*—Harold D. Anderson
*Assistant Examiner*—T. Mosley
*Attorney, Agent, or Firm*—Thomas J. Monahan

[57] ABSTRACT

The synthesis of the first examples of a new class of inorganic macromolecules, the polythiophosphazenes, is reported. When heated at 90° C., the cyclothiophosphazene $N_3P_2SCl_5$ undergoes ring-opening polymerization to yield the high polymeric polythiophosphazene $[N_3P_2SCl_5]_n$. The latter functions as a reactive macromolecular intermediate and undergoes halogen replacement with sodium phenoxide and sodium o-phenylphenoxide to afford the polymers $[N_3P_2S(OPh)_5]_n$ and $[N_3P_2S(OC_6H_4Ph-o)_{3.25}Cl_{1.75}]_n$, respectively.

3 Claims, No Drawings

METHOD FOR FORMING POLYTHIOPHOSPHAZENE MACROMOLECULES

Research leading to the making of the present invention was supported, in part, by funds from the United States Government. The United States Government has, therefore, certain rights to the invention described herein under 35 USC 200 et seq.

Macromolecules that possess backbones consisting entirely of inorganic elements are of considerable current interest both from the viewpoint of their unusual physical properties and their potential function as precursors to ceramic materials. [(Allcock, H. R. *Chem. Eng. News.* 1985, 63(11), 22); (Zeldin, M.; Wynne, K. J.; Allcock, H. R. Eds. "Inorganic and Organometallic Polymers"; ACS Symp. Ser., 1988, 360); (Kanatzidis, M. G.; Huang, S. *J. Am. Chem. Soc.* 1989, 111, 760–761); (Seyferth, D.; Rees, W. S.; Haggerty, J. S.; Lightfoot, A. *Chem. Mater.*, 1989, 1, 45); (Bowden, M. J.; Turner, R. Eds. "Electronic and Photonic Applications of Polymers"; Adv. Chem. Ser. 1988, 218]However, to date, relatively few well-characterized classes of these materials have been prepared.

Classical polyphosphazenes are a broad, well-established class of inorganic macromolecules with backbones of alternating phosphorus and nitrogen atoms. Their main method of synthesis, as depicted in the following sequence, involves the ring-opening polymerization of hexachlorocyclotriphosphazene according to general formula 1 at elevated temperatures, followed by replacement of the halogen atoms on the resulting repeating moiety according to general formula 2 by organic, inorganic, or organometallic units. This has provided access to a wide variety of stable and useful materials. [(Allcock, H. R. *Angew. Chem. Int. Ed. Eng.* 1977, 16, 147); (Zeldin, M.; Wynne, K. J.; Allcock, H. R. Eds. "Inorganic and Organometallic Polymers"; ACS Symp. Ser., 1988, 360, 250–282). The disclosures of which are incorporated herein.]

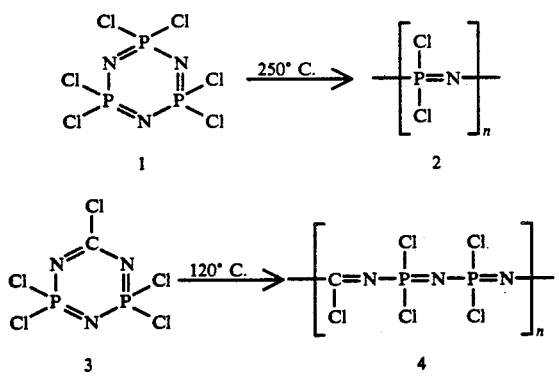

Recent research has emphasized polymerizations of cyclic species analogous to the compound according to general formula 1 but which contain skeletal heteroatoms in addition to phosphorus and nitrogen. Recently, the ring-opening polymerization of cyclocarbophosphazene was described which provided access to polycarbophosphazenes, a new class of inorganic-organic macromolecules. [Manners, I.; Renner, G.; Nuyken, O.; Allcock, H. R. *J. Am. Chem. Soc.*, 1989, 111, 5478, the disclosure of which is incorporated herein.]

One aspect of the present invention is the disclosure of a novel ring-opening polymerization of a compound containing a skeletal sulfur atom in addition to phosphorus and nitrogen. This provides a synthetic route to a new class of inorganic macromolecules, the polythiophosphazenes.

The cyclothiophosphazene of general formula 5 was prepared as an air- and moisture-sensitive colorless liquid via the (3+3) cyclocondensation reaction of $Me_3SiN=S=NSiMe_3$ [Wannagat, U.; Kuckertz, H. *Angew. Chem.*, 1962, 74, 117] with $[Cl_3P=N=PCl_3]Cl$ [Becke-Goering, M.; Lehr, W. *Z. Anorg. Allg. Chem.*, 1963, 325, 287] in $CCl_4$. This reaction proceeds in 80–90% yield as deduced by $^{31}P$ NMR spectroscopy. Although the isolated yield is only 40–50%, this synthetic route is a considerable improvement over previously published procedures. [The cyclothiophosphazene of general formula 5 was isolated as a colorless oil after purification by vacuum distillation (bp 72° C., 0.002 mmHg). A significant loss of product occurs due to polymerization in this process.] When the cyclothiophosphazene according to general formula 5 was heated over a 4 h period at 90° C. in an evacuated glass-tube, a gradual increase in viscosity was noted. Analysis by $^{31}P$ NMR [NMR spectra were recorded in dioxane ($^{31}P$) or $CDCl_3$($^1H$) on either a Bruker WP-360 or a JEOL FX-90 Q spectrometer. Chemical shifts are relative to 85% $H_3PO_4$ ($^{31}P$) or TMS ($^1H$)] showed that the products consisted of unreacted compound 5 (ca 10%) and the repeating polythiophosphazene the compound according to general formula 6 (ca 90%). In the scheme below, n is an integer greater than 100.

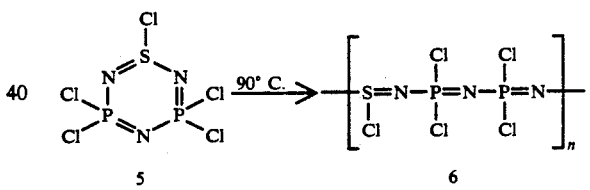

The $^{31}P$ NMR spectrum of the compound according to general formula 6 comprised a singlet resonance at −4.6 ppm which is significantly shifted to high field compared to that of compound 5 (delta=24.5 ppm). Similar high field shifts of the $^{31}P$ NMR resonance are observed in the formation of compound 2 (delta=−18.4 ppm) from compound 1 (delta=19.9 ppm) and of compound 4 (delta=−3.7 ppm) from compound 3 (delta=36.5 ppm).

Because of the sensitivity of the polythiophosphazene to moisture, attempts were made to substitute the chlorine atoms with aryloxy groups. This methodology leads to hydrolytically stable polymers in the case of polyphosphazenes and polycarbophosphazenes. [(Allcock, H. R. *Angew. Chem. Int. Ed. Eng.* 1977, 16, 147); (Manners, I.; Renner, G.; Nuyken, O.; Allcock, H. R. *J. Am. Chem. Soc.*, 1989, 111, 5478), the disclosures of which are incorporated herein] Thus, the polythiophosphazene (2.0 g) was reacted, in accordance with the following example, with excess sodium phenoxide (Dioxane, 25° C., 12 h) to produce a white, polymeric product according to the general formula 7.

EXAMPLE I

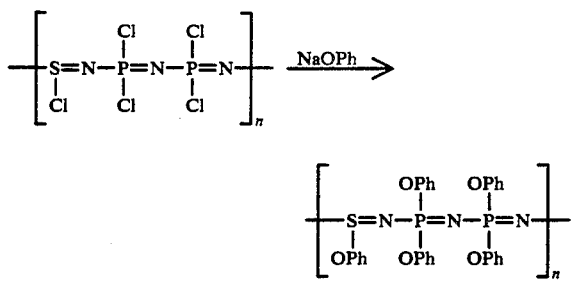

The isolated yield for the compound according to the general formula 7 was 2.4 g, 63%. ($^{31}$P NMR delta= −12.0 s, $^1$H NMR delta=7.2 br, s); [In a model reaction for the compound according to the general formula 5 was reacted with excess NaOPh (dioxane, 25° C., 12 h) to afford N$_3$P$_2$S(OPh)$_5$ as a moisture sensitive oil, $^{31}$P NMR delta=1.9 ppm; MS Theory 601, Found 508 (M+—OPh)]. However, the polymer according to the general formula 7 also proved to be sensitive to moisture, with significant decomposition noticeable after several hours in wet solvents. This sensitivity is almost certainly a consequence of the exposed sulfur-nitrogen multiple bonds in the polymer main chain. Attempts were, therefore, made to replace the chlorine atoms of the compound according to general formula 6 by more sterically demanding aryloxy substituents which would be expected to provide significant protection of the polymer backbone from nucleophilic attack. Thus, the polythiophosphazene of general formula 6 (2.56 g) in Dioxane (100 ml) was reacted, in accordance with the following example, with sodium o-phenylphenoxide (excess) at 25° C. for 5 days followed by sequential precipitation into water (twice) and hexanes (twice) to yielded a white polymeric material according to the general formula 8. The isolated yield of the polymer according to general formula 8 was 3.0 g, 52%.

EXAMPLE II

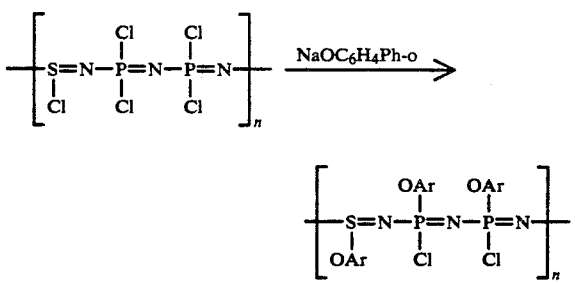

wherein Ar is a moiety having the formula C$_6$H$_4$Ph—o.

The $^{31}$P NMR spectrum of the compound according to the general formula 8 was indicative of incomplete chlorine atom replacement and showed two broad, singlet resonances at −12.3 and −16.9 ppm of approximately equal intensity. These were assigned to phosphorus atoms which bear, in the former case, two chlorine substituents or one chlorine and one aryloxy substituent, and in the latter case, two aryloxy substituents. The presence of unreacted chlorine substituents was confirmed by elemental analysis which indicated that approximately 65% of the halogen atoms of the repeating polythiophosphazene according to the general formula 6 had been replaced. [$^{31}$P NMR delta= −12.3 and −16.9 (both br, s), $^1$H NMR delta=7.2 br, s; Analysis for [N$_3$P$_2$S(OC$_6$H$_4$Ph—o)$_{3.25}$Cl$_{1.75}$]$_n$, Theory C 62.61, H 3.95, N 5.62, S 4.28, Cl 8.29, Found C 61.40, H 3.85, N 4.53, S 3.62, Cl 7.61.] However, despite the lack of complete chlorine atom replacement, the polymer according to the general formula 8 shows considerable stability toward hydrolysis. [By way of comparison, polydichlorophosphazene reacts with Na[OC$_6$H$_4$-Ph—o] (THF, 150° C., 14 d) to afford a hydrolytically stable polymer with 5% remaining chlorine atoms corresponding to 76% substitution.] Attempts to replace the unreacted chlorine atoms of the polymer according to the general formula 8 by reaction with nucleophiles such as trifluoroethoxide and phenoxide have been unsuccessful. The macromolecular nature of the polymer according to the general formula 8 was confirmed by Gel Permeation Chromotography [GPC data was recorded in THF and calibrated against polystyrene]. The values of M$_w$ obtained are considered estimates. which indicated a weight-average molecular weight (M$_w$) of 3.1×10$^5$ and a number average molecular weight (M$_n$) of 1.0×10$^5$.

[The schematic representation of the polymer according to the general formula 8 is oversimplified as both PCl$_2$ and P(OAr)$_2$ units are also present.]

A schematic representation of the reactions described in Examples I and II is:

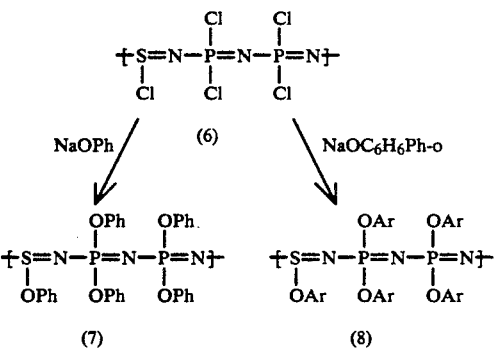

Where Ar can be potentially a wide variety of organic groups such as alkyl, aryl and/or alkoxide, aryloxide groups.

Preliminary studies indicate that the sulfur-chlorine bond of the compound according to general formula 6 is considerably more reactive than the phosphorus-chlorine bonds toward nucleophilic substitution. Thus, reaction of the polymer according to general formula 6 with one equiv. of sodium o-phenylphenoxide (dioxane, 15° C., 2 h) afforded a single new product with a $^{31}$P NMR singlet resonance at −7.4 ppm. The resonance is at only slightly higher field than that of the compound according to the general formula 6 (−4.6 ppm) as would be expected for chlorine substitution at sulfur rather than phosphorus. In a model reaction, the cyclic trimer according to formula 5 reacted similarly to afford N$_3$P$_2$S(OC$_6$H$_4$Ph—o)Cl$_4$ via exclusive substitution at sulfur [$^{31}$P NMR delta=20.0. Preliminary studies have shown that the remaining chlorine atoms or N$_3$P$_2$S(OCH$_6$H$_4$Ph—o)Cl$_4$ can be replaced via reaction with sodium trifluoroethoxide to afford [N$_3$P$_2$S(OC$_6$H$_4$-Ph—o)(OCH$_2$CF$_3$)$_4$]($^{31}$P NMR delta=2.1; MS Theory 701, Found 701)] This suggests that a range of regiospecific polymers with different substituents at sulfur and phosphorus may be accessible.

Thus, while we have illustrated and described the preferred embodiment of our invention, it is to be understood that this invention is capable of variation and modification, and we, therefore, do not wish or intend to be limited to the precise terms set forth, but desire and intend to avail ourselves of such changes and alterations which may be made for adapting the invention of the present invention to various usages and conditions. Accordingly, such changes and alterations are properly intended to be within the full range of equivalents and, therefore, within the purview of the following claims. The terms and expressions which have been employed in the foregoing specification are used therein as terms of description and not of limitation, and thus there is no intention in the use of such terms and expressions of excluding equivalents of features shown and described or portions thereof, it being recognized that the scope of the invention is defined and limited only by the claims which follow.

Having thus described our invention and the manner and process of making and using it in such full, clear, concise, and exact terms so as to enable any person skilled in the art to which it pertains, or to with which it is most nearly connected, to make and use the same.

What is claimed is:

1. A method for forming the repeating monomeric subunit polymer $[N_3P_2S(OPh)_5]$ which comprises: providing a high polymeric polythiophosphazene macromolecule of the repeating subunit $[N_3P_2SCl_5]$; reacting said macromolecule with sodium phenoxide for a sufficient time and temperature to cause halogen replacement; and isolating the desired repeating monomeric subunit polymer.

2. A method for forming the repeating monomeric subunit polymer $[N_3P_2S(OC_6H_4Ph\text{—}o)_{3.25}Cl_{1.75}]$ which comprises: providing a high polymeric polythiophosphazene macromolecule of the repeating subunit $[N_3P_2SCl_5]$; reacting said macromolecule with sodium o-phenylphenoxide for a sufficient time and temperature to cause halogen replacement; and isolating the desired repeating monomeric subunit polymer.

3. A polymer having at least one repeating monomeric subunit selected from the group consisting of:

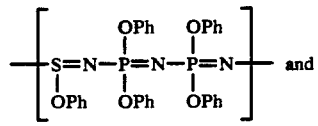 and

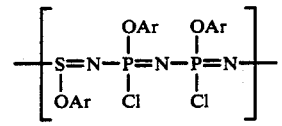

wherein Ar is $C_6H_4Ph\text{—}o$.

* * * * *